United States Patent
Kramer et al.

(10) Patent No.: US 9,436,003 B2
(45) Date of Patent: Sep. 6, 2016

(54) ROBUST INDEX CORRECTION OF AN ANGULAR ENCODER IN A THREE-DIMENSIONAL COORDINATE MEASUREMENT DEVICE

(71) Applicant: FARO Technologies, Inc., Lake Mary, FL (US)

(72) Inventors: Alexander Kramer, Kornwestheim (DE); Martin Ossig, Tamm (DE); Reinhard Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/699,022

(22) Filed: Apr. 29, 2015

(65) Prior Publication Data
US 2015/0323354 A1    Nov. 12, 2015

Related U.S. Application Data

(60) Provisional application No. 61/991,916, filed on May 12, 2014.

(51) Int. Cl.
*G01D 18/00* (2006.01)
*G02B 26/10* (2006.01)
(Continued)

(52) U.S. Cl.
CPC .......... *G02B 26/105* (2013.01); *G01C 15/002* (2013.01); *G01D 5/24452* (2013.01);
(Continued)

(58) Field of Classification Search
CPC ............. G01D 18/00; G01D 5/34707; G01D 5/3473; G01D 5/24452; G02B 26/105

USPC ....................................... 250/231.13–231.18
See application file for complete search history.

(56) References Cited

U.S. PATENT DOCUMENTS 5,852,413 A * 12/1998 Bacchi .................. H03M 1/308
  250/231.18
5,939,712 A *  8/1999 Venugopal ........... G01D 5/2455
  250/231.13
(Continued)

FOREIGN PATENT DOCUMENTS

DE   102009015922 A1   10/2010
EP       1489387 A1   12/2004
(Continued)

OTHER PUBLICATIONS

International Search Report and Written Opinion for Application No. PCT/US2015/028396 dated Aug. 20, 2015; 10 pgs.

*Primary Examiner* — Seung C Sohn
(74) *Attorney, Agent, or Firm* — Cantor Colburn LLP

(57) ABSTRACT

A 3D measurement device sends a beam of light to a point on an object, receives the reflected light, and determines a distance and two angles to the point, one of the angles measured by an angular encoder, which includes a disk having incremental marks and an index mark. Light from the 3D device is rotated to reflect light from a reference reflector to produce a first synchronization signal. A first difference angle is determined based on counts of the incremental marks and on the first synchronization signal. Light from the 3D device is rotated to reflect light from the reference reflector to produce a second synchronization signal. A second difference angle is determined based on counts of the incremental marks and on the second synchronization signal. The reference correction value of the index mark is determined based on the first and second difference angles.

5 Claims, 18 Drawing Sheets

(51) Int. Cl.
*G01D 5/347* (2006.01)
*G01D 5/244* (2006.01)
*G01S 17/42* (2006.01)
*G01S 17/89* (2006.01)
*G01S 7/481* (2006.01)
*G02B 17/08* (2006.01)
*G01S 7/497* (2006.01)
*G01C 15/00* (2006.01)
*G01S 17/66* (2006.01)

(52) U.S. Cl.
CPC ........ *G01D5/3473* (2013.01); *G01D 5/34707* (2013.01); *G01D 18/00* (2013.01); *G01S 7/4817* (2013.01); *G01S 7/497* (2013.01); *G01S 17/42* (2013.01); *G01S 17/89* (2013.01); *G02B 17/08* (2013.01); *G01S 17/66* (2013.01)

(56) References Cited

U.S. PATENT DOCUMENTS

| | | | |
|---|---|---|---|
| 5,969,344 A * | 10/1999 | Tseng | G01D 5/34 250/231.13 |
| 6,145,368 A | 11/2000 | Klein | |
| 2006/0043964 A1 | 3/2006 | Watanabe et al. | |
| 2009/0072130 A1 | 3/2009 | Chase et al. | |
| 2014/0063489 A1 | 3/2014 | Steffey et al. | |
| 2014/0078519 A1 | 3/2014 | Steffey et al. | |

FOREIGN PATENT DOCUMENTS

| | | |
|---|---|---|
| WO | 2007083118 A1 | 7/2007 |
| WO | 2014043461 A1 | 3/2014 |

\* cited by examiner

CROSS SECTION A-A

SECTION B-B

ROBUST INDEX CORRECTION OF AN ANGULAR ENCODER IN A THREE-DIMENSIONAL COORDINATE MEASUREMENT DEVICE

CROSS REFERENCE TO RELATED APPLICATION

The present application claims the benefit of U.S. Provisional Application, 61/991,916, filed May 12, 2014, the contents of which are incorporated by reference herein.

BACKGROUND OF THE INVENTION

The subject matter disclosed herein relates to use of an incremental angular encoder in a three-dimensional (3D) coordinate measurement device such as a laser scanner, laser tracker, or total station. Such devices steer a beam of light to a target, which may be a cooperative target such as a retroreflector or a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

The present document discusses the case of a laser scanner, but the extension to a laser tracker or total station will be clear to one of ordinary skill in the art. Laser scanners are typically used for scanning closed or open spaces such as interior areas of buildings, industrial installations and tunnels. Laser scanners are used for many purposes, including industrial applications and accident reconstruction applications. A laser scanner can be used to optically scan and measure objects in a volume around the scanner through the acquisition of data points representing objects within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a three-dimensional image representing the scanned area or object. In order to generate the image, at least three values are collected for each data point. These three values may include the distance and two angles, or may be transformed values, such as the x, y, z coordinates.

Angular encoders are used to measure the two angles of rotation about the two axes of rotation. One type of angular encoder includes a disk and one or more read heads. In an embodiment, the disk is affixed to a rotating shaft, and the one or more read heads are affixed to a portion that is stationary with respect to the rotating shaft. In a type of angular encoder known as an incremental encoder, the disk includes a collection of incremental encoder lines closely spaced at equal intervals along a circle centered on the disk. In addition, an incremental encoder also includes a reference mark, also known as an index mark, which may be a line or a more complicated pattern. Unlike an absolute encoder having a pattern that enables every angular position of the disk to be determined, an incremental encoder provides no such information but rather relies on a serial counting of the incremental lines combined with an initialization based on a signal received from the index mark.

Signals indicating the positions of the incremental lines and the index mark are provided by one or more read heads placed in proximity to the disk. The read head sends out a beam of light that in some cases is reflected off the disk to one or more optical detectors that convert the received light into electrical signals. In other cases, the read heads send out a beam of light that passes through the disk to be received by one or more optical detectors on the other side. In most cases, the angular encoder resolves interpolated angles that are much finer than the angular separation between lines.

For some 3D coordinate measurement devices, the index mark is also used to establish an absolute angular position of the rotating shaft relative to the device. In these cases, there is a need to know whether the absolute angle indicated by the index pulse has changed over time, for example, as a result of a mechanical shock.

Accordingly, while existing 3D coordinate measurement devices are suitable for their intended purposes, what is needed is a 3D coordinate measurement device having certain features of embodiments of the present invention.

BRIEF DESCRIPTION OF THE INVENTION

According to one aspect of the invention, a method is given for obtaining a reference correction value for an angular encoder in a laser scanner. The method includes providing the laser scanner, the laser scanner having a body, a light source, a first motor, a second motor, a first angle measuring device, a second angle measuring device, a distance meter, and a processor, the body including a reference reflector, the light source configured to launch a transmission light beam, the distance meter configured to receive a portion of the transmission light beam reflected off an object and to determine a distance from the scanner to the object in response, the distance based at least in part on the speed of light in air, the first motor and the second motor configured to direct the transmission light beam to a first direction, the first angle measuring device configured to measure a first angle of rotation about a first axis, the second angle measuring device configured to measure a second angle of rotation about the second axis, the first direction determined by the first angle of rotation and the second angle of rotation, the first angle measuring device being the angular encoder, the angular encoder including a patterned element and a read head assembly, the read head assembly including a first read head and a second read head, the patterned element including a plurality of incremental marks and an index mark. In a first instance, steps are taken that include: rotating the transmission light beam about the first axis; observing the index mark with the first read head and initializing a first count of the incremental marks in response; sending the transmission light beam to the reference reflector, reflecting a portion of the transmission light beam as a reference reflected light into the distance meter, and producing with the distance meter a first synchronization signal in response; determining with the processor a first difference angle based at least in part on the first count of incremental marks and on the first synchronization signal. In a second instance, steps are taken that include: rotating the transmission light beam about the first axis; observing the index mark with the first read head and initializing a second count of the incremental marks in response; sending the transmission light beam to the reference reflector, reflecting a portion of the transmission light beam as a reference reflected light into the distance meter, and producing with the distance meter a second synchronization signal in response; determining with the processor a second difference angle based at least in part on the second count of incremental marks and on the second synchronization signal; and determining with the processor the reference correction value based at least in part on the first difference angle and the second difference angle.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
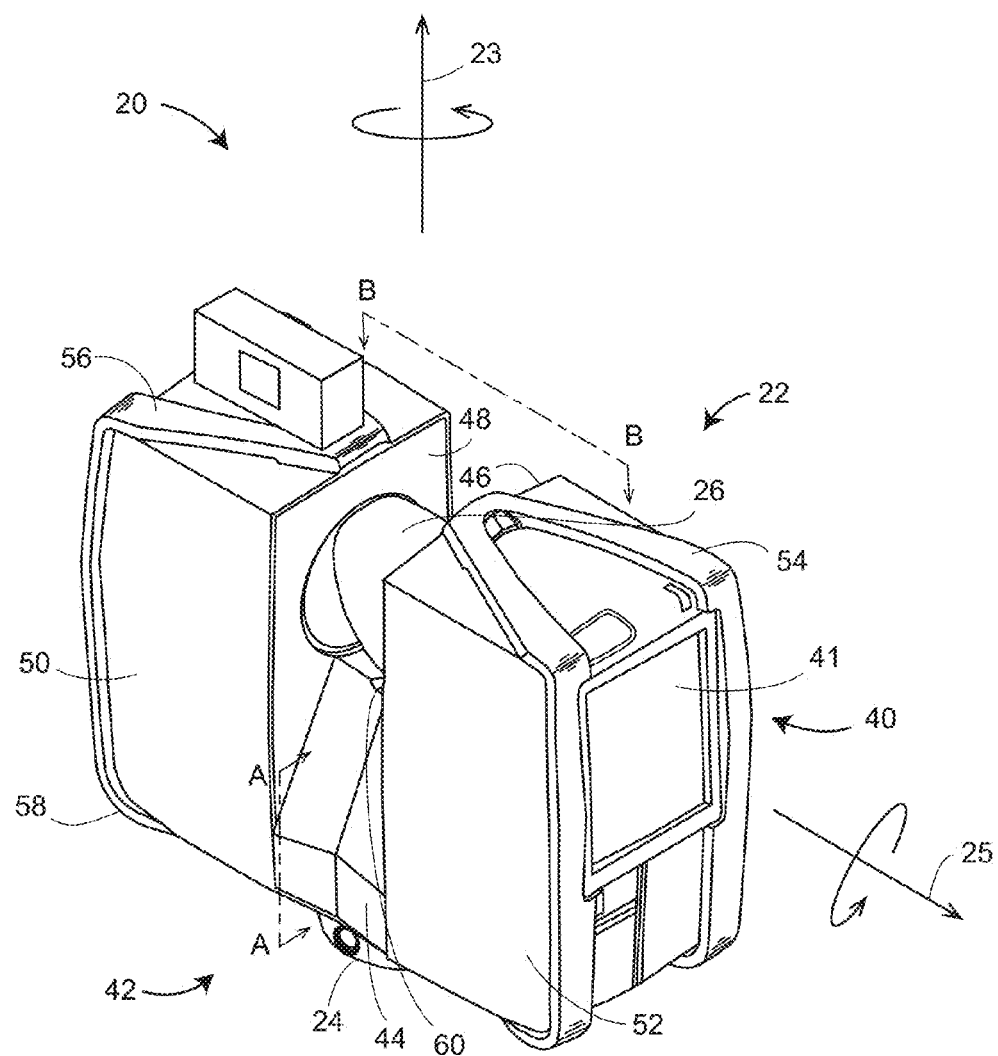
FIG. 1 is a perspective view of a laser scanner in accordance with an embodiment of the invention.
Figure 2:
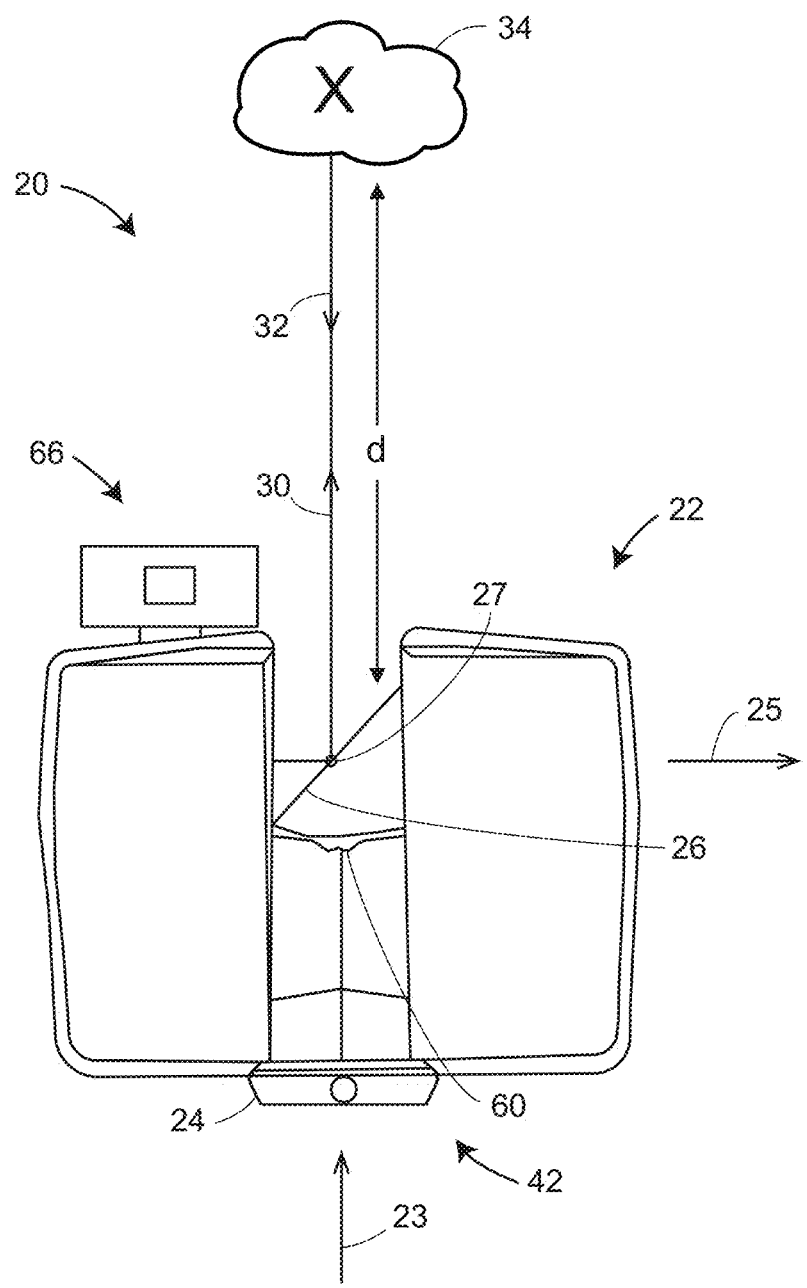
FIG. 2 is a side view of the laser scanner illustrating the method of measurement.
Figure 3:
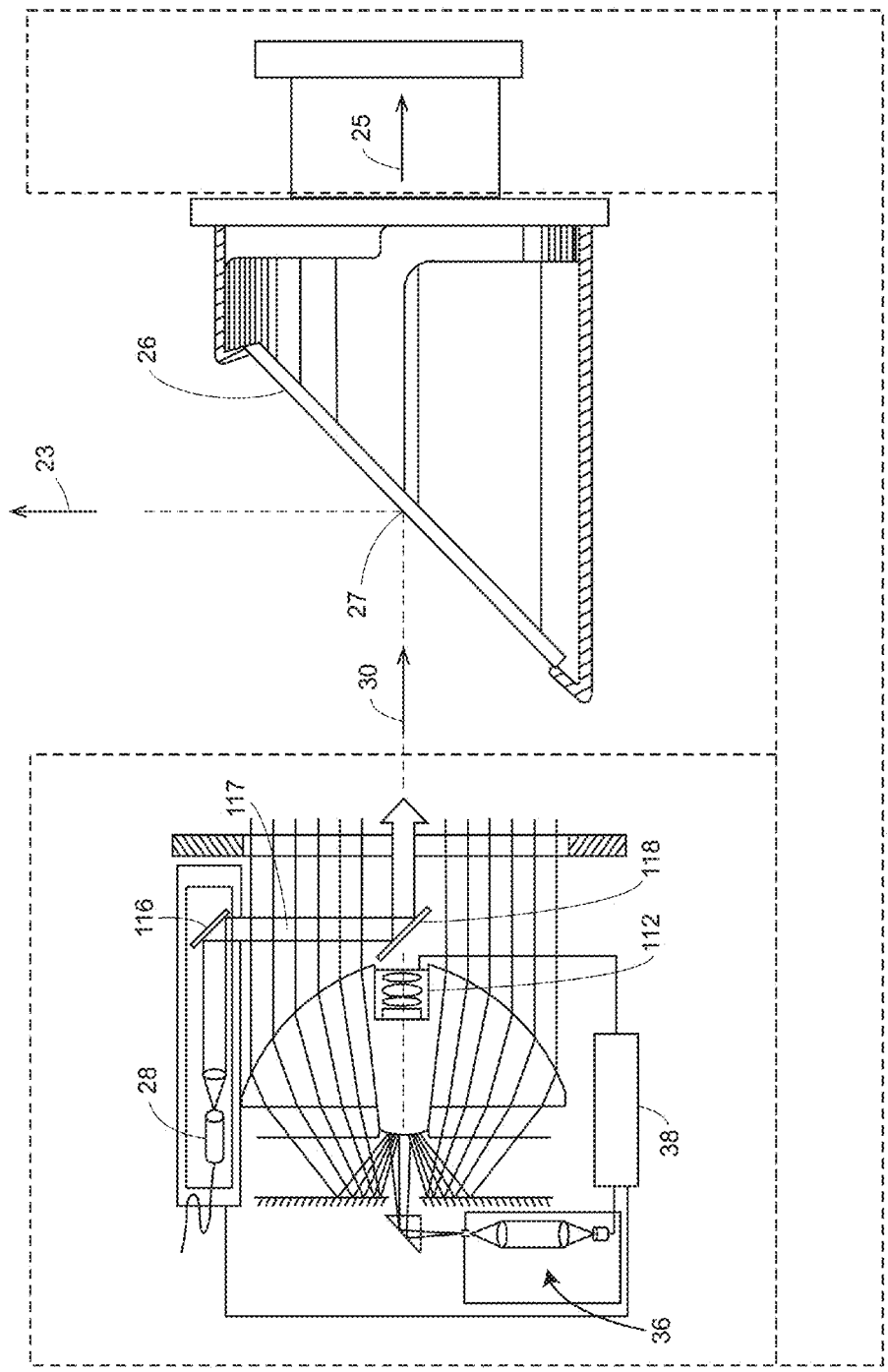
FIG. 3 is a schematic illustration of the optical, mechanical, and electrical components of the laser scanner.

The detailed description explains embodiments of the invention, together with advantages and features, by way of example with reference to the drawings.

DETAILED DESCRIPTION OF THE INVENTION

The present invention relates to a 3D coordinate measurement device that sends a beam of light to an object in a direction determined by two or more incremental angular encoders within the device. Embodiments of the present invention provide a method for providing an absolute index position that is stable over time.

Although this document is applicable to many types of 3D coordinate measurement devices that steer a beam of light to a target, examples given hereinbelow refer to a laser scanner rather than a laser tracker or total station, as such an extension will be apparent to one of ordinary skill in the art.

Referring now to FIGS. 1-5, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about a vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axis 25 and 23, respectively. These angular positions in turn depend on the corresponding rotary drives that each includes at least one encoder.

Coupled to the light emitter 28 and the light receiver 36 is a controller 38. The controller 38 determines, for a multitude of measuring points X, a corresponding number of distances d between the laser scanner 20 and points X on object 34. The distance to a particular point X is determined based at least in part on the speed of light in air through which electromagnetic radiation propagates from the device to the object point X. In one embodiment the phase shift between the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air} = c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based one known length and two known angles of a triangle. The method of triangulation, therefore, does not directly depend on the speed of light in air.

The scanning of the volume about the laser scanner 20 takes place by quickly rotating the rotary mirror 26 about axis 25 while slowly rotating the measuring head 22 about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power. The gray-scale value may be determined, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54 and the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d depend on signal intensity, such as brightness, and temperature for example. In an embodiment, a distance correction is stored in the scanner as a function (possibly a nonlinear function) of distance to a measured point and brightness of light returned from the measured point. Since the prism 60 is at a known distance from the gimbal point 27, the measured brightness level of light reflected by the prism 60 may be used to correct distance measurements for other measured points, thereby allowing for compensation of environmental variables such as temperature. In the exemplary embodiment, the adjustment of the distance correction is performed by the controller 38. In other embodiments, described in more detail hereinbelow, the prism further provides a means of correcting for movement of the encoder index mark in relation to stationary portion of the device 20.

The base 24 is coupled to a swivel assembly (not shown) such as that described in commonly owned PCT Application Serial No. PCT/EP2011/003263, which is incorporated herein in its entirety. The swivel assembly is housed within the carrying structure 42 and includes a motor that is configured to rotate the measuring head 22 about the axis 23.

An auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light emitter 28 is reflected off a fixed mirror 116, travels to dichroic beam-splitter 118 that reflects the light 117 from the light emitter 28 onto the rotary mirror 26. The dichroic beam-splitter 118 allows light at wavelengths different than the wavelength of light 117 to pass through. For example, the light emitter 28 may be a near infrared laser light (for example, light at wavelengths of 780 nm or 1150 nm), with the dichroic beam-splitter 118 configured to reflect the infrared laser light while allowing visible light (e.g. wavelengths of 400 to 700 nm) to transmit through. In other embodiments, the determination of whether the light passes through the beam-splitter 118 or is reflected depends on the polarization of the light. The digital camera 112 takes 2D photographic images of the scanned area in order to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
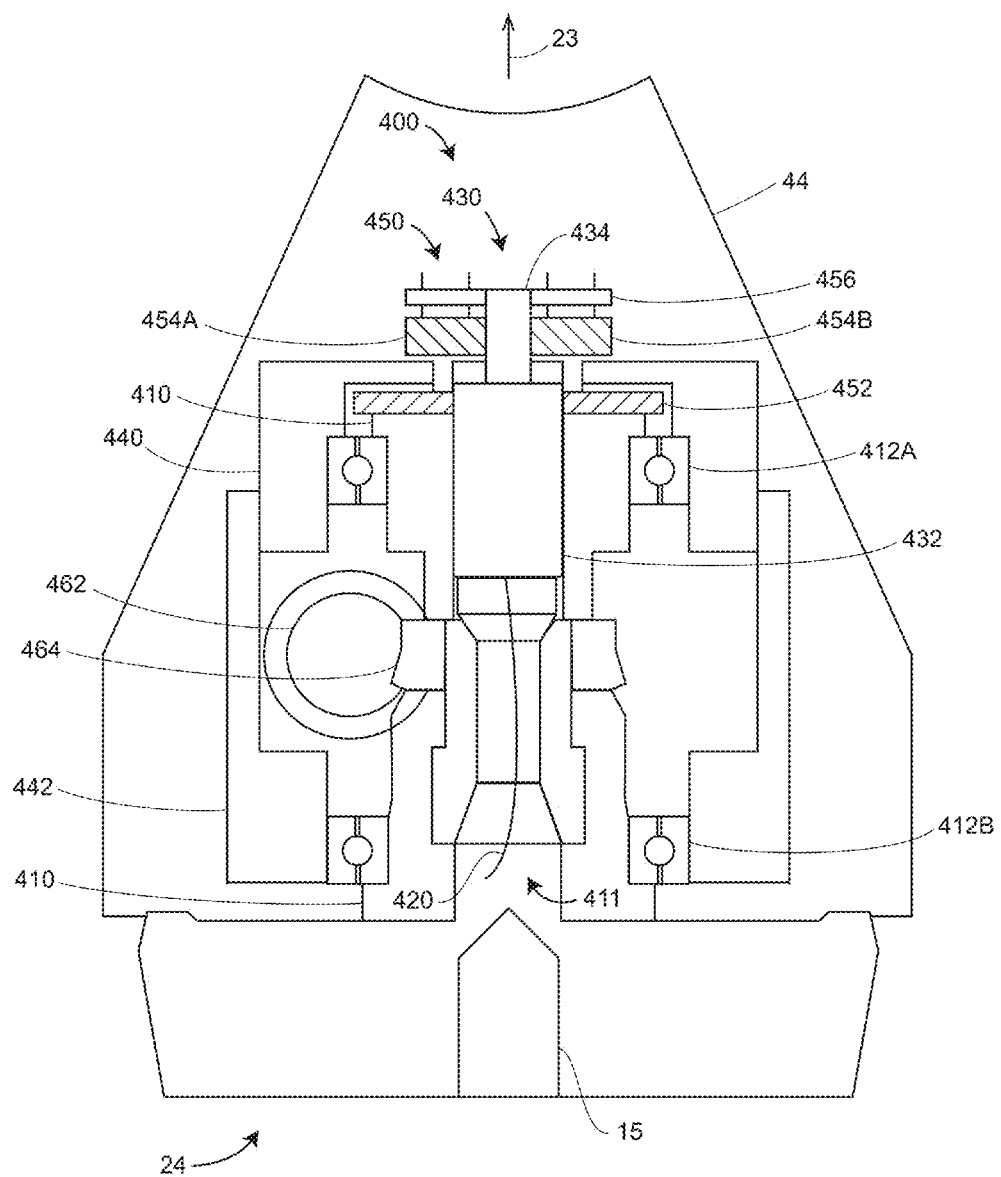
FIG. 4 is a side cross-sectional view showing azimuth angular encoder and bearings of the laser scanner of FIG. 1.
Figure 5:
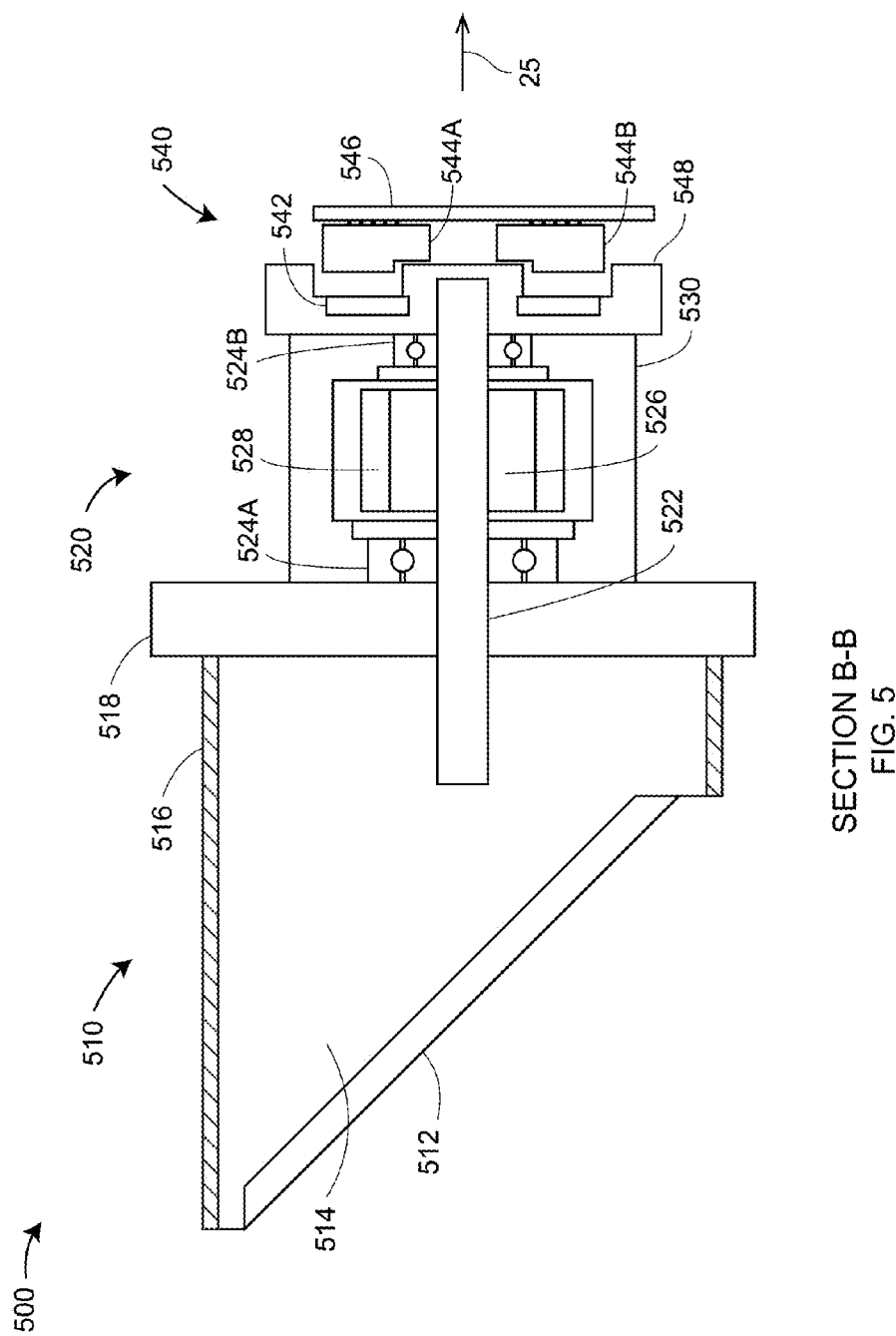
FIG. 5 is a side cross-sectional view of zenith mirror assembly, motor, encoder, and bearings of the laser scanner of FIG. 1.

FIG. 1 shows the locations of two cross-sectional views A-A and B-B that appear in FIGS. 4 and 5, respectively. In FIG. 4, the assembly 400 shows elements involved in the movement of the measuring head 22 about the vertical axis 23. In an embodiment, the base 24 attaches to a mounting structure such as a tripod by means of an threaded hole 15. A shaft 410 that is stationary with respect to base 24 is in contact with one side of bearings 412A, 412B. The shaft 410 has a hollow central portion 411 through which electrical cable 420 is routed to carry electrical signals to a first portion 432 of slip ring 430. Structural elements 440, 442 and traverse 44 rotate about the vertical axis 23 with respect to the base 24 through contact with bearings 412A, 412B. Motion of the rotating elements is provided by worm drive 462 in contact with worm gear 464. A second portion 434 of slip ring 430 also rotates with respect to the base. Electrical contacts within the slip ring enable electrical connectivity to be maintained while the second portion 434 rotates relative to the first portion 432. Encoder 450 includes encoder disk 452 and read heads 454A, 454B. Electrical signals are exchanged between circuit board 456 and read heads 454A, 454B.

Figure 6:
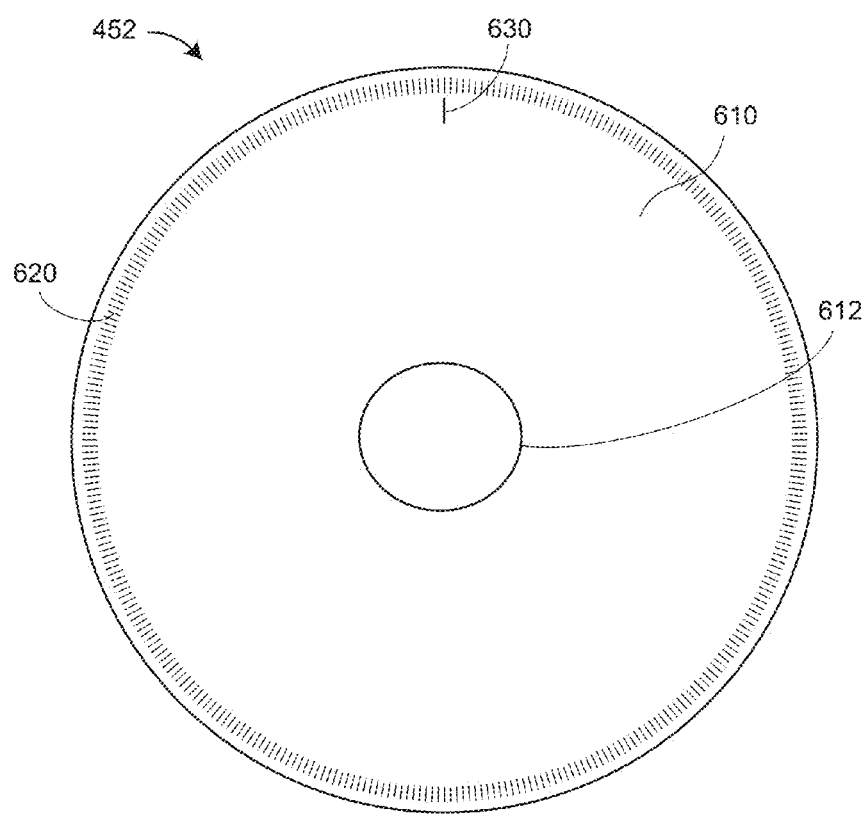
FIG. 6 is an illustration showing lines on an encoder disk.

FIG. 6 shows an example of an encoder disk 452 that includes a circular glass element 610 that may include a mounting hole 612, the circular glass element having printed on it a collection of incremental lines 620 and an index mark 630. In an embodiment, the lines are printed on the glass with chrome using a photolithography process. For the cross section of FIG. 4, the encoder disk 452 is coupled to the inner core 410, which is stationary with respect to the base 24. In an embodiment, the encoder disk 452 is attached to inner core with adhesive such as ultraviolet setting cement. In an embodiment, prior to affixing the disk, the encoder disk is centered on the rotating shaft by lightly tapping the disk while reading electrical quadrature signals on an oscilloscope, for example, in a Lissajous pattern.

Read heads 454A, 454B are attached to portions of the structure 400 that rotate with respect to the base 24. In an embodiment, read heads 454A, 454B emit beams of light that reflect off lines on the encoder disk 452, including incremental lines 620 and index mark 630. The reflected light is received by optical detectors on the read heads. In response, electrical signals from the optical detectors are processed by electronics to obtain an angular reading for the rotating components with respect to the base 24. The angular readings are obtained using a combination of readings from the incremental lines and the index mark. In one method known in the art, an electrical signal produced by one of the read heads in response to a reflection from the index mark starts the counting by both read heads of the incremental signals obtained from the incremental lines. A means is provided in the electronics to determine whether the direction of rotation is clockwise or counterclockwise. In other words, a means is provided to determine whether the net number of incremental line counts is increasing or decreasing. Each incremental line corresponds to an angular change and so by multiplying the number of counts by the incremental angular change, an angle of rotation of the disk 452 can be determined at any given time. In most cases, a means is provided for interpolating between incremental lines so that, for some angular encoders, resolution of the measured angle of rotation is a fraction of a microradian.

Figure 7C:
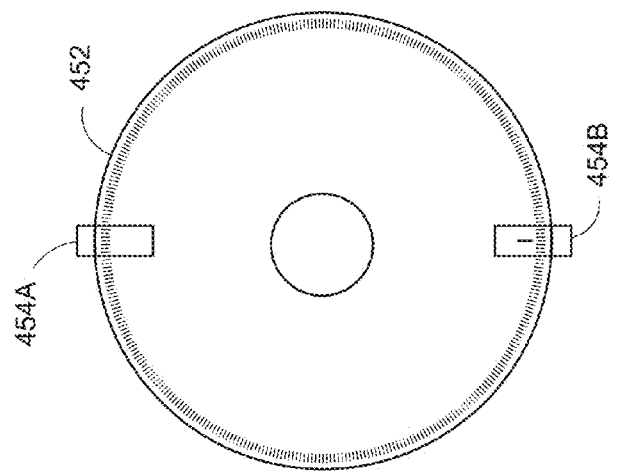
FIGS. 7A-C show two read heads and an encoder disk.
Figure 7B:
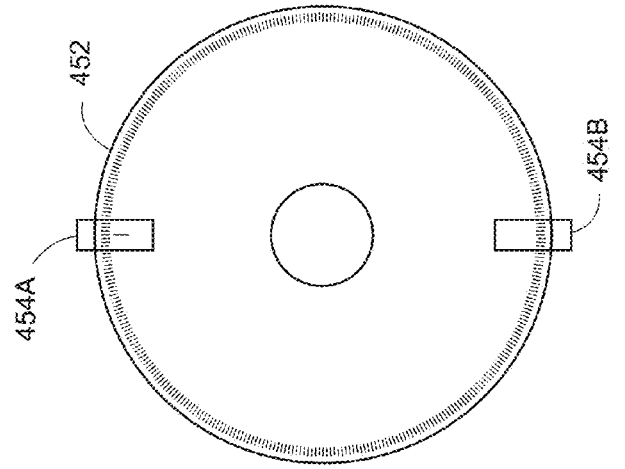
Figure 7A:
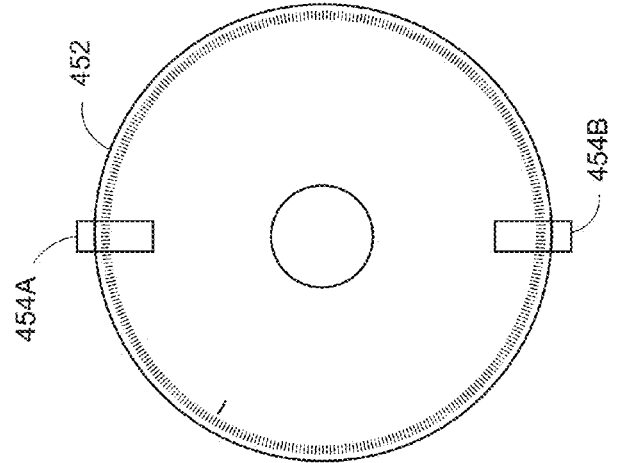

In most cases, the signal from the index mark is obtained after repowering the device 20. Thereafter the device 20 keeps track of the number of counts without further need for a signal from the index mark. Usually, the index mark from only one of the two read heads is used to provide the signal for each of the two read heads 454A, 454B to start counting the incremental lines. In other words, suppose that the device 20 is powered up and initial measurement tasks completed with the encoder disk positioned relative to the read heads 454A, 454B as shown in FIG. 7A. The device 20 rotates the read heads 454A, 454B to the position of FIG. 7B, at which time the read head 454A passes over the index line. This produces an electrical signal that starts the counting of the incremental lines by the two read heads 454A, 454B. In an embodiment, the readings of the incremental lines obtained from the read heads 454A, 454B are averaged together to obtain an average incremental reading. In most implementations, the electrical signal obtained from the read head 454B as the index mark passes it in FIG. 7C is ignored as are subsequent readings of the signal from the index pulse at the upper read head 454A.

In the discussion hereinabove, the encoder 430 includes two read heads. In some cases, encoders include three or more read heads, the data of which may be further processed to obtain still more accuracy. For example, three read heads may be spaced around the encoder disk with separations of 120 degrees. The incremental readings from these three read heads may be averaged together. Similarly, four read heads may be spaced around the encoder disk with separations of 90 degrees, and the incremental readings from these averaged together. The methods described hereinbelow may be extended to these cases, as will be clear to one of ordinary skill in the art.

FIG. 5 shows a cross-sectional view B-B from FIG. 1. FIG. 5 depicts a cross section of a mirror drive assembly 500 that includes a rotor 510, motor assembly 520, and angular encoder 540. The rotor 510 includes a rotary mirror 512, holder 514, housing 516, and end plate 518. The motor assembly 520 includes shaft 522, bearings 524A, 524B, rotor 526, stator 528, and enclosure 530. The shaft 522 is affixed to the housing 516. In an embodiment, the rotor 526 is a permanent magnet attached to the shaft 522 and stator 528 is a field winding actuated by an electrically changing field that causes the shaft 522 to rotate. Bearings 524A, 524B provide low friction contact for rotation of the shaft 522. The angular encoder 540 includes disk 542, read heads 544A, 544B, circuit board 546, and disk housing 548. The shaft 522 is affixed to the disk housing 548, which in turn holds the encoder disk 542. Read heads 544A, 544B attach to circuit board 546 and are stationary with respect to the axis of rotation 25. Read heads 544A, 544B and encoder disk 542 cooperate to determine the angle of rotation of the shaft 522 in a manner similar to that described for the elements of FIG. 4.

If the disk 452 is not perfectly centered on the rotating shaft, the incremental encoder lines 620 converge to a point that is different than the center of rotation of the axle on which the disk 452 is mounted. This difference in the center of the encoder lines and the center of rotation is referred to as the eccentricity of the mounted encoder. A method of eliminating errors associated with encoder eccentricity is to use two read heads 454A, 454B separated by 180 degrees as shown in FIGS. 7A-C. The three figures show the disk in different angular positions as indicated by the position of the index mark in the figures. This method is discussed hereinbelow.

In a perfectly aligned encoder having two read heads separated nominally by 180 degrees, the encoder lines converge to an encoder center point coinciding with a center of rotation of the axle on which the encoder disk is mounted, and the read heads are evenly spaced about the center of rotation.

In a first case of non-perfect (read head) alignment, the encoder center point coincides with the center of rotation of the disk, but the read heads are shifted upward, downward, or sideways about the center of rotation. In a second case of non-perfect (centering) alignment, the two read heads are evenly spaced about the center of rotation, but the encoder center point does not coincide with the center of rotation. These two cases of non-perfect alignment are now discussed.

Figure 8:
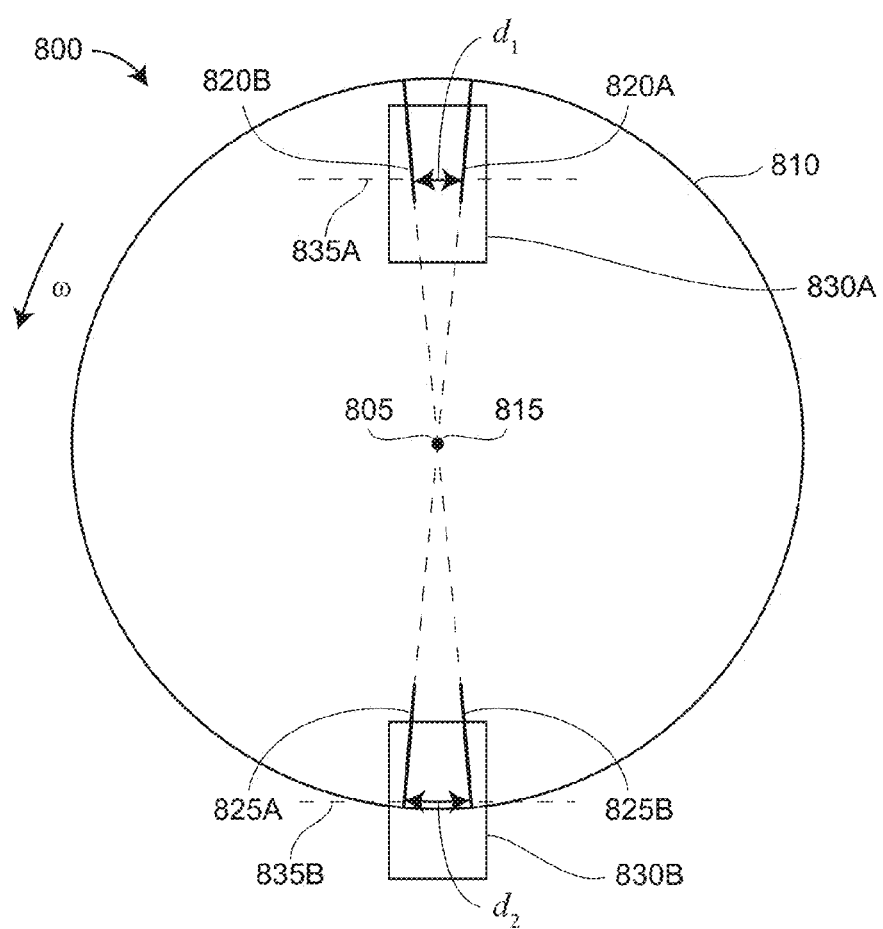
FIG. 8 is a schematic illustration of an encoder having read heads shifted up and down relative to an encoder center.

FIG. 8 illustrates the first case of non-perfect (read head) alignment is shown for the situation in which read heads are shifted upward or downward. An encoder 800 includes an encoder disk 810 that includes encoder lines 820A, 820B, 825A, 825B in addition to many other incremental lines not shown in the figure. The encoder lines 820A, 820B, 825A, 825B converge to the encoder center point 815, which in this case is the same as the center of rotation 805 of the axle. The encoder 800 includes read heads 830A, 830B placed above and below the center of rotation 815, respectively. For the sake of clarity, the relative size of the incremental lines and the relative shift of the read heads are greatly exaggerated in relation to the size of the disk 810 in FIG. 8.

Read head 830A is located directly above the center of rotation 805, and the read head 830B is located directly below the center of rotation 805. The read heads 830A, 830B read the encoder lines at the read head positions 835A, 835B, respectively. Read head 830A reads the encoder line 820A and at the same time read head 830B reads the encoder line 825A. At a different instant in time, read head 830A reads the encoder line 820B and at the same time read head 830B reads the encoder line 825B. The angle between adjacent encoder lines is equal to 360 degrees divided by the total number of lines. For example, if the number of incremental encoder lines is 4096, the angle between adjacent encoder lines is equal to 360°/4096=0.08789 degree. The angle between the adjacent incremental encoder lines measured by each read head 830A, 830B is the same even though the read heads are not the same distance above or below the center of rotation 815.

Figure 9:
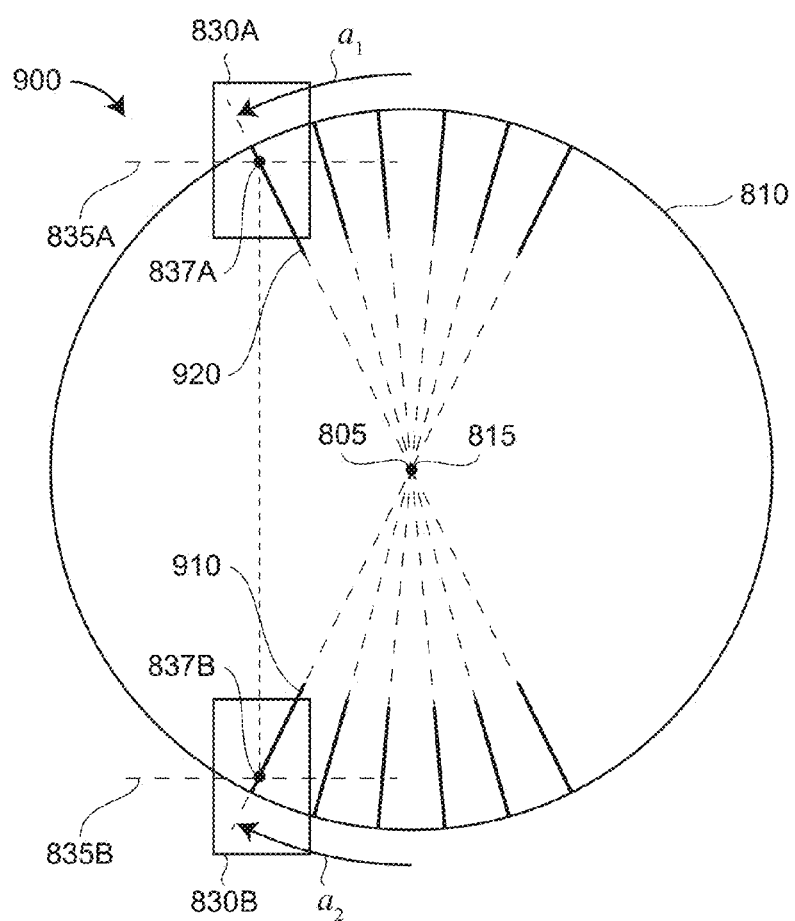
FIG. 9 is a schematic illustration of an encoder having read heads shifted side to side relative to an encoder center.

FIG. 9 illustrates the first case of non-perfect (read head) alignment is shown for the situation in which read heads are shifted to the side. An encoder 900 includes an encoder disk 810 having encoder lines 910, 920 in addition to many other incremental lines shown and not shown in the figure. The encoder lines 910, 920 converge to the encoder center point 815, which in this case is the same as the center of rotation 805 of the axle. The encoder 800 includes read heads 830A, 830B placed to one side of the center of rotation 805. For the sake of clarity, the relative size of the incremental lines and the relative shift of the read heads are greatly exaggerated in relation to the size of the disk 810 in FIG. 9.

The read head 830A reads encoder line 920 at position 837A, and the read head 830B reads encoder line 910 at position 837B. The angle of the encoder line 920 with respect to a point directly above the center of rotation 805 is $a_1$. The angle of the encoder line 910 with respect to a point directly below the center of rotation 805 is $a_2$, but in the opposite direction. If the readings of the encoder 830A and 830B are averaged, the angular reading will change by $(a_1-a_2)/2$. If $a_1=a_2$, there will be no change in the angular reading as a result of the relative movement of the read heads 830A, 830B to the side.

If one of the read heads 830A, 830B of FIG. 9 shifts more to the side than the other read head, the two read heads may still be understood as having equal shifts to the side if their shift is taken as the position of a line connecting the read heads 830A, 830B to the center of rotation 805. The overall effect of such an additional shift of one read head to the side may therefore be understood as a combination of three separate actions for the two read heads—a shift to the side, a shift up-and-down, and an additional rotation of the disk relative to the line connecting the read heads. The effects of the shift to the side and the shift up-and-down cancel out when encoder readings are averaged, as explained hereinabove. The effect of the residual rotation is accounted for by a change in the index reading whenever the scanner is powered up.

In other words, use of two read heads eliminates changes in averaged angular readings resulting from movement of read heads in response to bearing runout as long as the bearing runout is relatively consistent from rotation to rotation. Bearing runout effects may be characterized using precision measurement methods such as those described in *Precision Spindle Metrology*, Eric Marsh, DEStech Publications, Inc., 2007, pages 1-7, incorporated herein by reference. As explained in this reference, bearing runout may be synchronous or asynchronous. Synchronous errors are repeated on each rotation of the axle. Asynchronous errors vary somewhat from rotation to rotation. If a pair of mechanical roller bearings are separated by at least 10 cm and if appropriate preloading is applied to the bearings, then the combination of synchronous and asynchronous bearing runout will not usually produce an angular runout variation exceeding at most several arc seconds.

On the other hand, over a longer time or under severe conditions, a more dramatic change in the position of read heads or encoder disk may occur. One way this can happen is if the mechanical structure holding the read heads moves. This may occur, for example, if the screws or other attachment mechanisms shift following a severe impact, for example, if the instrument is dropped. Another way a change can occur in the relative position of the disk and read heads over a longer time is if the bearings shift on the axle to which they are mounted, for example, as a result of a shift in adhesive bonding the encoder disk.

Figure 10:
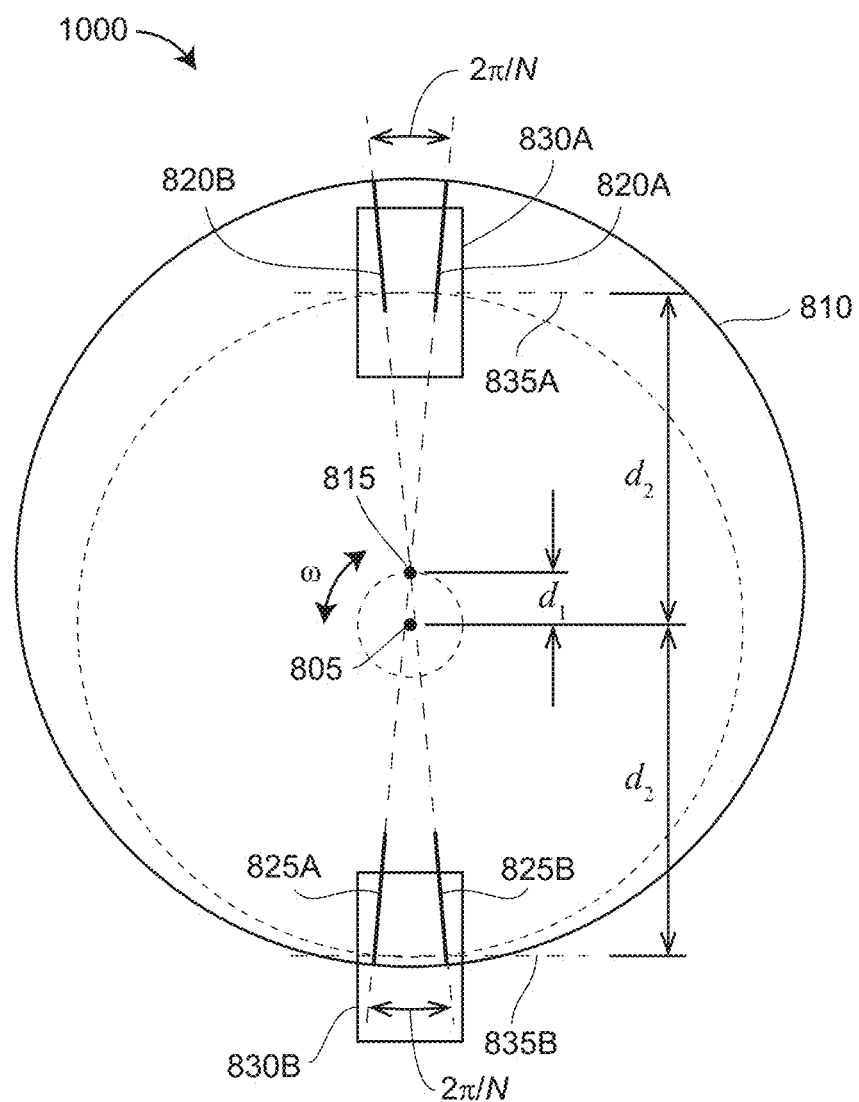
FIG. 10 is a schematic illustration of an encoder having a center of encoder lines at a different point than a center of rotation.

In the second case of non-perfect (centering) alignment described hereinabove, the two read heads are evenly spaced about the center of rotation, but the encoder center point does not coincide with the center of rotation. The second case of non-perfect alignment is illustrated in FIG. 10. An encoder 1000 includes an encoder disk 810 that includes encoder lines 820A, 820B, 825A, 825B in addition to many other incremental lines not shown in the figure. The encoder lines 820A, 820B, 825A, 825B converge to the encoder center point 815, which in this case is a different point than the center of rotation 805 of the axle. The encoder 800 includes read heads 830A, 830B placed above and below the center of rotation 815, respectively. For the sake of clarity, the relative size of the incremental lines and the relative shift of the read heads are greatly exaggerated in relation to the size of the disk 810 in FIG. 10.

Figure 11:
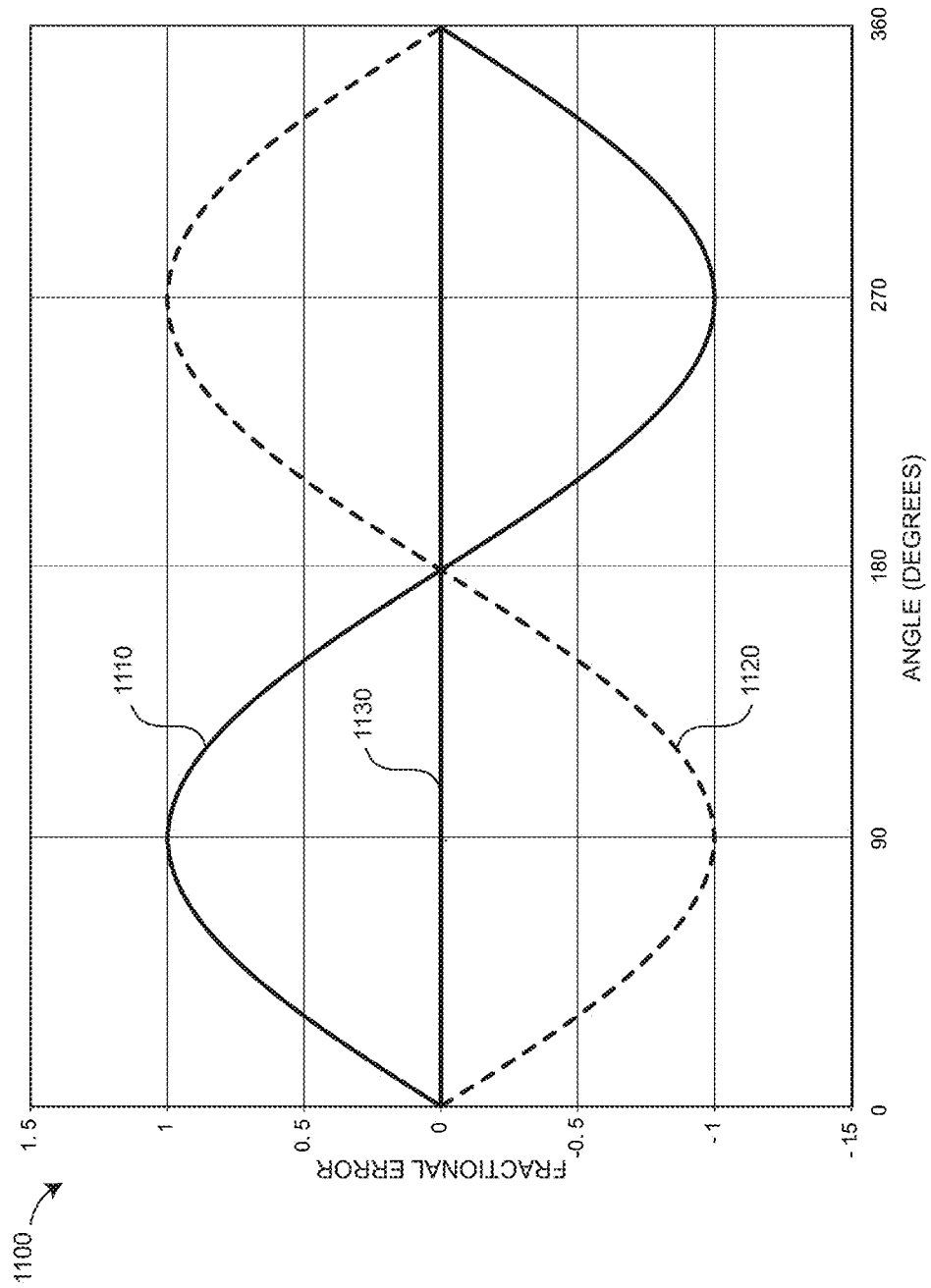
FIG. 11 is a plot for the encoder of FIG. 10 of the relative fractional error for each of the two read heads and for the average of the two read heads over 360 degrees.

Read head 830A is located directly above the center of rotation 805, and the read head 830B is located directly below the center of rotation 805. The distance from the center of rotation 805 to the read head measurement position 835A is $d_2$, and the distance from the center of rotation 805 to the read head measurement position 835B is also $d_2$. The distance from the center of rotation 805 to the center of the encoder lines 815 is $d_1$. The length of an arc centered at 815 and drawn between encoder lines 820A, 820B at the read head position 835A is equal to $(d_2-d_1)(2\pi/N)$. Between the encoder lines 820A, 820B, the actual angle of rotation of the axle about the center of rotation 805 is the arc length between the two encoder lines divided by the distance from the point of rotation, or $(d_2-d_1)(2\pi/N)/d_2$. The nominal value of rotation for the center of rotation 805 aligned with the center of the encoder lines is $2\pi/N$. The error in encoder reading between the encoder lines 820A, 820B is then $2\pi/N-(d_2-d_1)(2\pi/N)/d_2=(2\pi/N)(d_1/d_2)$. In other words, in this position, the angle between the two encoder lines is thought to be larger than it actually is. In the general case, the angle $2\pi/N$ between the encoder lines 820A, 820B may be represented by a differential angle $d\theta$, so that the differential error $d\epsilon$ in the encoder angle reading is $d\epsilon=(d_1/d_2)d\theta$. For the lower read head 830B, a similar calculation to that performed hereinabove shows that the error between the two encoder lines 825A, 825B is the negative of the error for the upper read head, or $-(2\pi/N)(d_1/d_2)$. The corresponding differential error for the lower read head 830B is $d\epsilon=-(d_1/d_2)d\theta$. When the center of encoder lines 815 is directly left or right of the center of rotation 805, the differential error is $d\epsilon=0$. The differential encoder error at an arbitrary angle $\theta$ varies sinusoidally with angle: $d\epsilon(\theta)=(d_1/d_2)\cos(\theta)d\theta$. The overall error $\epsilon$ at an angle $\theta$ is found by integrating the differential error to obtain $\epsilon(\theta)=(d_1/d_2)\sin(\theta)$. For this example, the angle $\theta$ is taken to be zero at the position of the upper encoder 830A. FIG. 11 shows, over encoder angles of 0 to 360 degrees, the fractional angular error for the read head 830A in curve 1110 and the fractional angular error for the read head 830B in curve 1120. Here fractional angular error is defined as the error $d\epsilon(\theta)$ divided by the maximum error $d_1/d_2$.

As explained in the Marsh 2007 reference, which is incorporated by reference, angle readings of angular encoders mounted on axles having bearings may be decomposed into periodic (synchronous) and aperiodic (asynchronous) components. The synchronous components repeat every 360 degrees, while the asynchronous components do not. The largest error component is almost always the first-order cyclic component that repeats once every 360 degrees. This first-order error is due to the mis-centering effect discussed in relation to FIGS. 10 and 11. FIG. 11 also includes a curve 1130, which is the average reading of the two read heads. As indicated, the error 1130 is zero.

Figure 12:
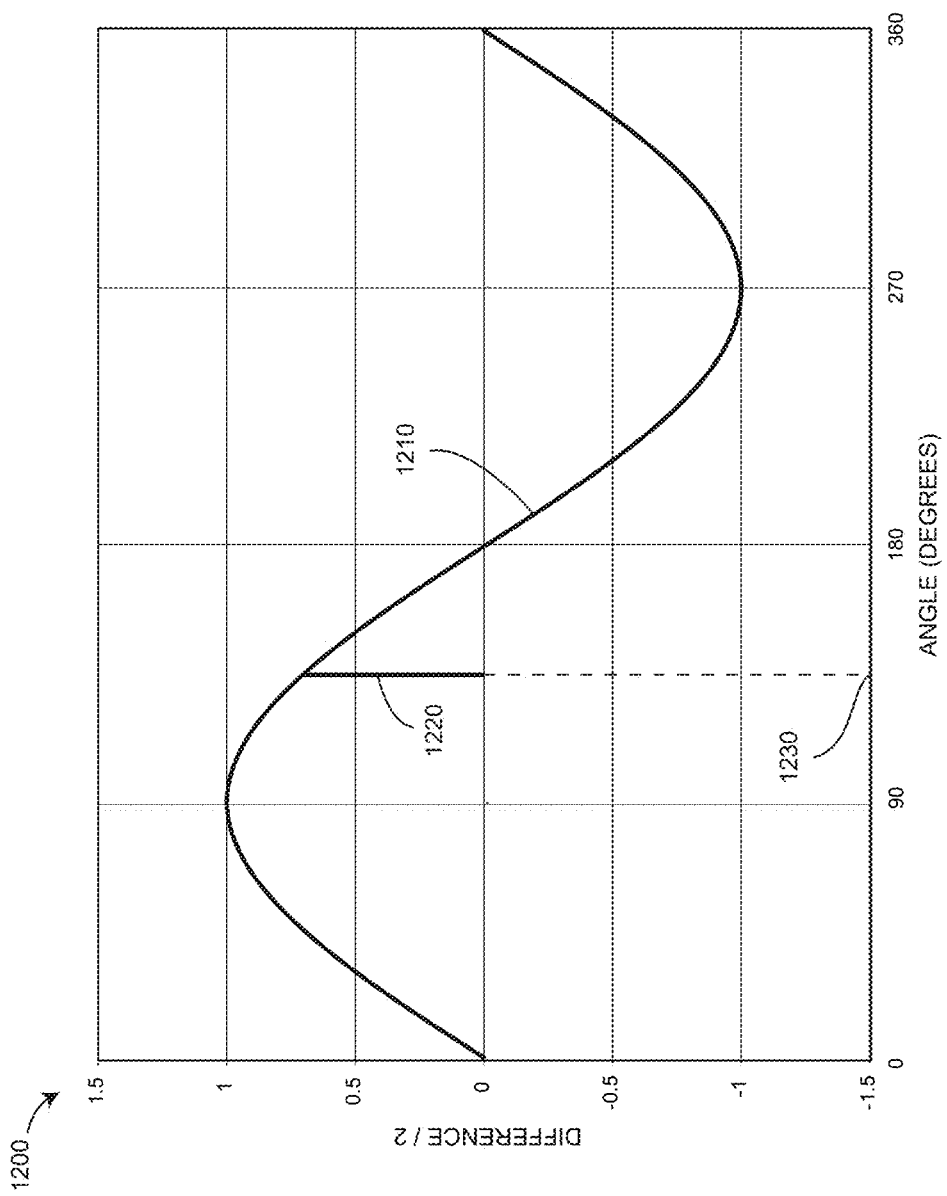
FIG. 12 is a plot for the encoder of FIG. 10 of half the difference of the relative fractional errors of the read heads over 360 degrees.

FIG. 12 shows a sinusoid obtained by taking the first-order periodic component of half the difference in the readings of the read heads 830A, 830B. During one angular position of the read heads, a signal will be received by a first of the read heads, say 830A, from an index mark such as the index mark 1320 of FIG. 13. The angular position at which this index mark is observed is indicated by line 1220 in FIG. 12.

When the curve 1210 is at zero, the read head 830A in FIG. 10 is above and perpendicular to a line connecting points 815 and 805. Based on this information, it is possible to draw the vector diagram of FIG. 14. The vector from 815 to 805 is an eccentricity vector 1420 corresponding to a maximum angular error. The direction of the index mark in relation to the eccentricity vector is known from 1220 of FIG. 12. The angle $\theta$ may be calculated by taking the first-order periodic component of the difference in angular readings of the read heads 830A, 830B, the readings averaged over some integer number of 360° cycles. Here the eccentricity vector 1420 is referenced to the index mark read upon power up of the system. Alternatively, the angle $\theta$ may be based on the actual encoder readings without extracting the first-order periodic component of the difference in angular readings. In some cases, these actual encoder readings are stable enough over multiple rotations to produce an almost identical vector diagram of FIG. 14 without extracting the first-order component.

In some 3D measurement devices, it is important to know the angular position of the emitted beam of light in an absolute sense, that is, the angular position of the beam of light with respect to a stationary portion of the device. In the scanner of FIG. 1, it is important to know the angle of the rotating mirror 26 in relation to an absolute direction of the beam of light emitted by the scanner. The mirror directs the beam of light in a complete circle about the horizontal axis 25, and so it is possible to capture all 360 degrees about the vertical axis 23 by rotating the measuring head 22 about the base 24 by an angle of only half that amount, or 180 degrees. To do this, the collected data for each swept circle of light (i.e., the circle lying in a vertical plane) is divided into a front part and a back part. The front part starts in a position directly overhead the scanner and moves to the front of the scanner. The back part starts in a position directly overhead the scanner and moves to the back of the scanner. It is important that the front part and the back part be separated along the line of the axis 23.

Figure 15A:
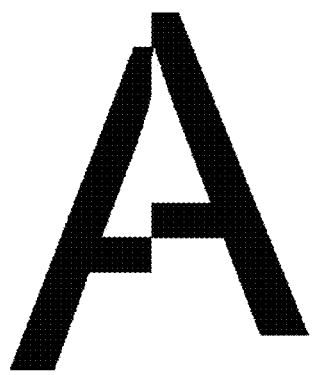
FIGS. 15A and 15B illustrate a problem that may occur in the scanner of FIG. 1 when the position of an encoder index mark shifts over time.
Figure 15B:
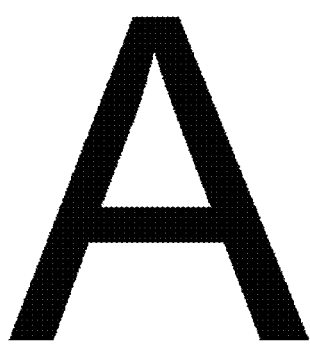

If the front part and back part are not separated along the line of the axis 23, a discontinuity can arise in the collected data. For example, this error can cause a letter "A" marked on a wall as in FIG. 15B to be reconstructed from the scanner data with a discontinuity as in FIG. 15A.

To determine the position of the mirror 26 at which the laser beam is sent directly in line with the axis 23, a compensation procedure is carried out, usually in the factory. In one such procedure, an object having a sharp outline is placed on a wall. The position of the index mark position of the axis 23 in relation to an index mark on the encoder 540 is determined by minimizing discontinuities in the sharp outline when viewed in the front half and the back half of the swept (vertical) plane of light.

Another important reason to know the angle of the rotating mirror 26 in relation to an absolute direction of the beam of light emitted by the scanner is to correctly determine the position of measured 3D coordinates in relation to a gravity vector. The scanner 20 of FIG. 1 may include a two-axis inclinometer, also known as a level, for determining the orientation of the scanner 20 in relation to the gravity vector. With this known orientation, the 3D coordinates collected in the scanner frame of reference may be transformed into a gravity frame of reference. This method only works properly if the scanner knows the position of the emitted beam of light in relation to the axis 23.

In many cases, encoder disks are attached to an axle or other structure with adhesive that cures rapidly when exposed to ultraviolet light. The encoder disk is tapped into place while reading the electrical signals from the read heads. In many cases, the electrical signals are sent into an oscilloscope, and the adjustment is made based on the observed Lissajous pattern. Once the correct alignment has been obtained, the ultraviolet light is turned on and the disk quickly fixed in place.

Such adhesive has a coefficient of thermal expansion, which may cause the disk to shift slightly in relation to the center of rotation. Hence in different operating environments, the eccentricity vector 1420 may shift slightly in relation to the index unit vector 1410. More importantly, adhesive attachment is more susceptible than mechanical attachment (e.g., screws) to movement or breakage as a result of mechanical shock. Such a movement or breakage may cause a change in the position of the index line in relation to the measuring head 22.

Figure 14:
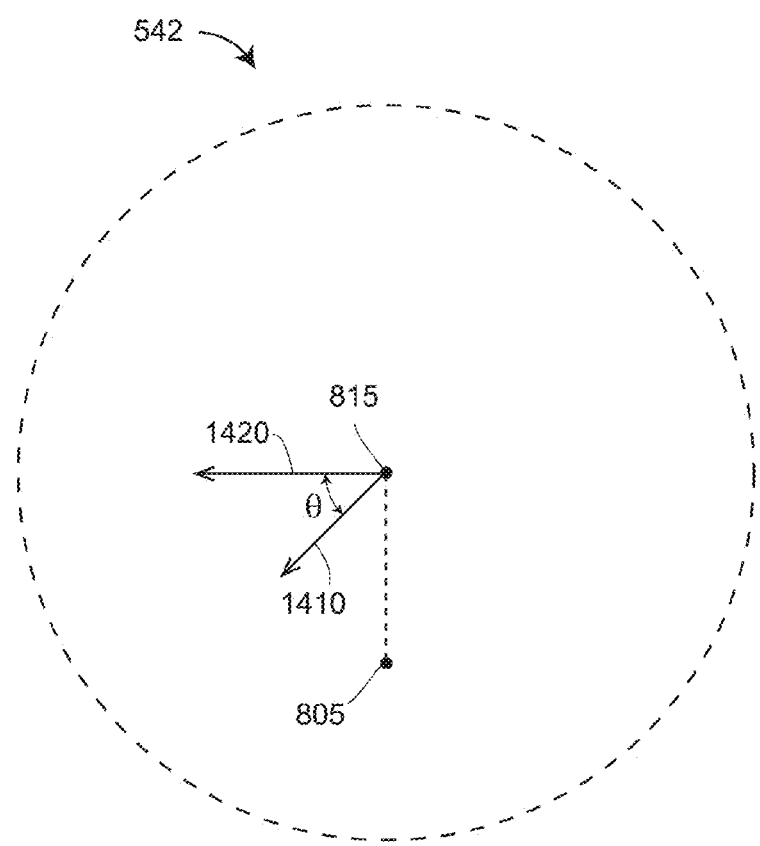
FIG. 14 shows an angle determined from an index unit vector and an eccentricity vector.
Figure 16:
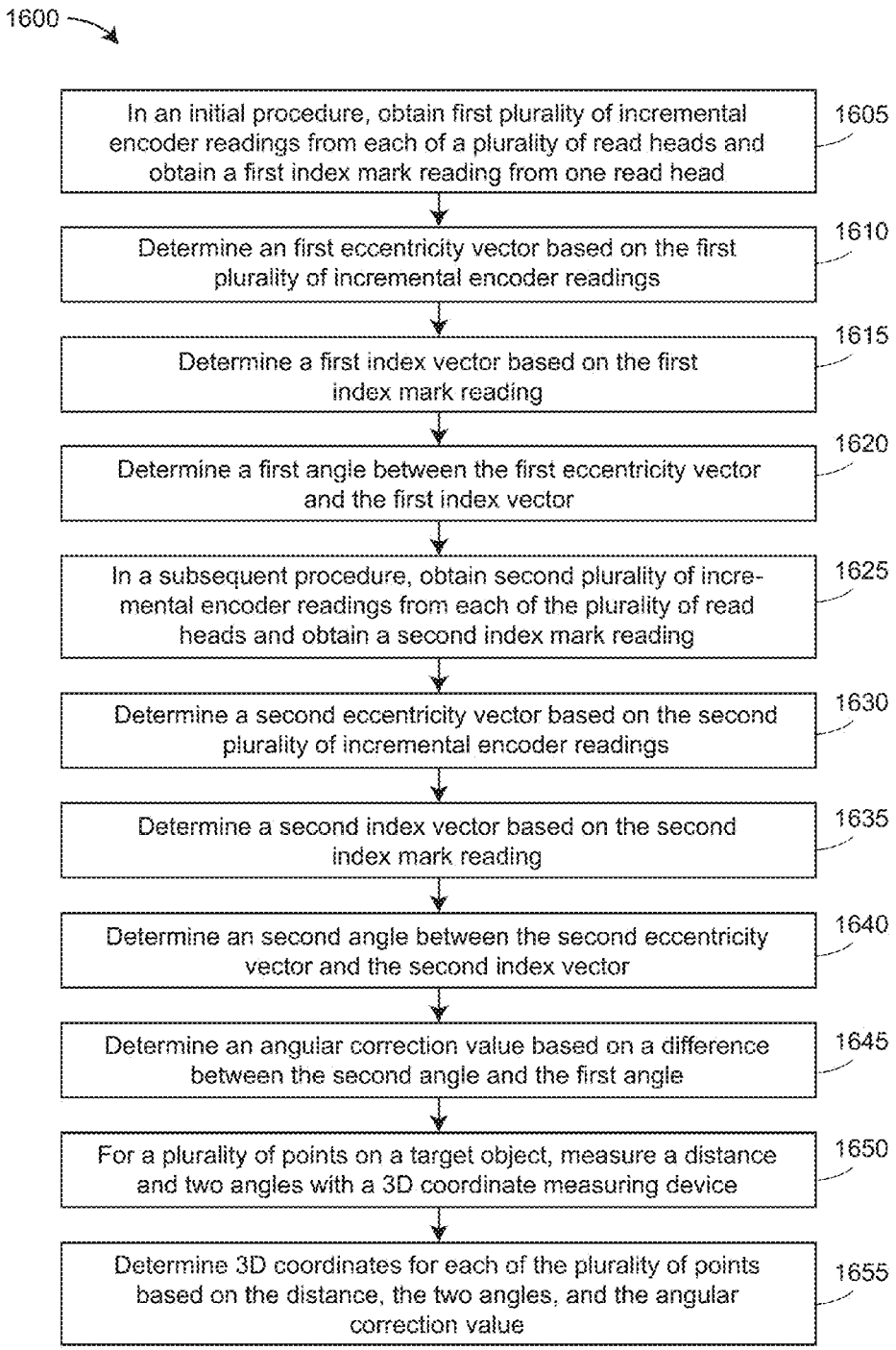
FIG. 16 is a flowchart describing a method for determining an angular correction value based on a plurality of encoder readings.

A way to ensure that a shift in eccentricity of the disk has not compromised the absolute position of the index line is to follow the procedure 1600 of FIG. 16. In a step 1605, in an initial procedure, a first plurality of incremental encoder readings are obtained from two or more read heads and a first index mark is obtained from one read head. In an embodiment, this procedure is carried out at the factory. In a step 1610, a first eccentricity vector is found based at least in part on the first plurality of incremental encoder readings. In a step 1615, a first index vector is found based at least in part on the first index mark reading. In a step 1620, a first angle between the first eccentricity vector and the first index vector is found. This angle corresponds to an initial angle θ as shown in FIG. 14. In a step 1625, in a subsequent procedure, a second plurality of incremental encoder readings are obtained from two or more read heads and a second index mark reading is obtained from the one read head. In an embodiment, this procedure is carried out whenever the scanner 20 is repowered. In a step 1630, a second eccentricity vector is found based at least in part on the second plurality of incremental encoder readings. In a step 1635, a second index vector is found based at least in part on the second index mark reading. In a step 1640, a second angle between the second eccentricity vector and the second index vector is found. In a step 1645, an angular correction value is determined based at least in part on a difference between the second angle and the first angle. In a step 1650, the scanner measures the distance and two angles to a plurality of points on an object. In a step 1655, 3D coordinates for each of the plurality of points is determined based at least in part on the distance, the two angles, and the angular correction value. In other words, the change in the absolute position of the index pulse is determined based on the shift in encoder eccentricity, and the correction applied to the calculated direction of the emitted light.

If the correction is not found to be stable over successive power-up cycles of the scanner, this may be an indication that something has come loose inside the scanner. In this case, the scanner may be returned for repair.

The method of FIG. 16 uses encoder measurements to detect a change in encoder eccentricity and a corresponding shift in the position of the emitted light in relation to an index mark signal. A second method now considered directly measures light sent to the prism target 60 on the scanner 20 to correct the position of an index mark on an encoder.

Figures 17A, 17B, 17C:
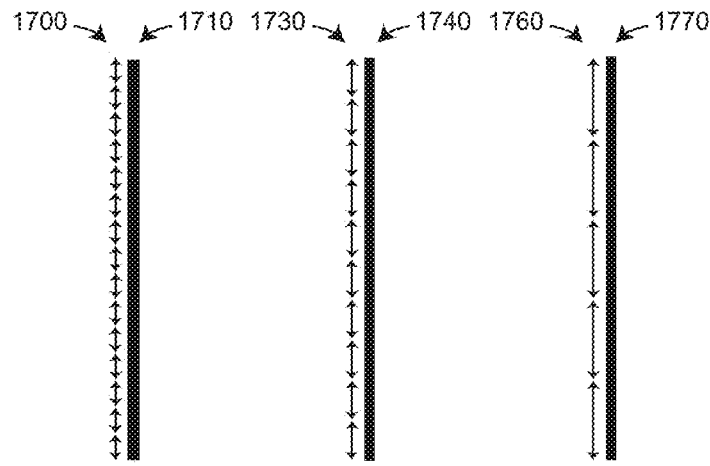
FIGS. 17A-C show a pattern of emitted light from the scanner of FIG. 1 for three different rotation rates of the steering mirror.

As explained hereinabove, in an embodiment the scanner 20 emits a line of light in a spiral pattern with the light varied rapidly about a horizontal axis 25 and slowly about a vertical axis 23. Hence, the light striking a flat wall may appear to travel in straight unbroken vertical lines 1710, 1740, and 1770 as shown in FIGS. 17A-C, respectively. In an embodiment, the mirror 26 turns at a constant rate about the horizontal axis, with the rate of rotation selectable by the operator. The operator may also select an integration time per measured point. The combination of the speed of rotation and the integration time per measured point determines the spacing of measurement points. For a relatively slow rotation of the mirror 26 and a relatively short integration time, the spacing between measurement points 1710 may relatively small, as shown in FIG. 17A. For a more rapid rotation of FIG. 17B or still more rapid rotation of FIG. 17C, the spacing between measurement points 1730, 1760 is correspondingly increased.

Figure 18A:
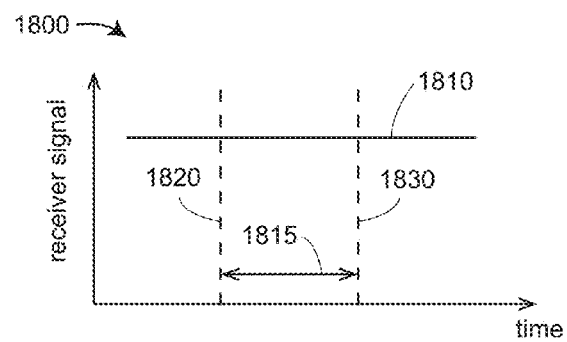
FIGS. 18A and 18B show optical power received by a receiver of the scanner of FIG. 1 for two different patterns of emitted light.
Figure 18B:
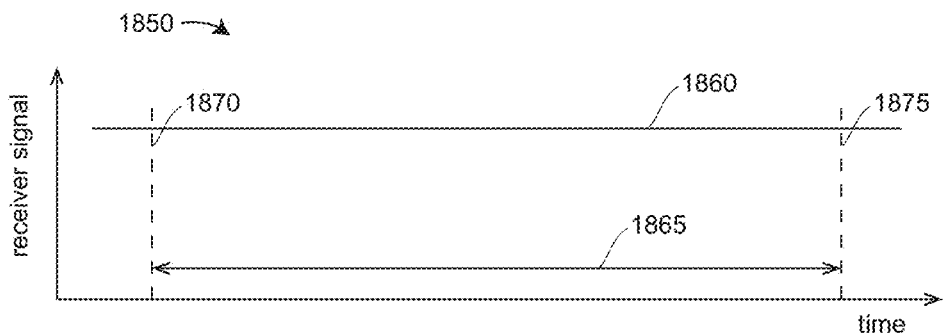

The light reflected from the object 34 off the mirror 26, through the optical system, and into the optical receiver 36 produces a receiver electrical signal in response to the incident light. In an embodiment, the signal 1810, 1860 is nearly constant as shown in FIGS. 18A and 18B, respectively. In FIG. 18A, the integration time 1815 between the times 1820, 1830 is relatively shorter than the integration time 1865 between the times 1870, 1875 of FIG. 18B. In an embodiment, modulated light emitted by the scanner reflects off the prism 60, is received by the receiver 36, with the modulation used to determine the times 1820, 1830, 1870, 1875.

Figure 13:
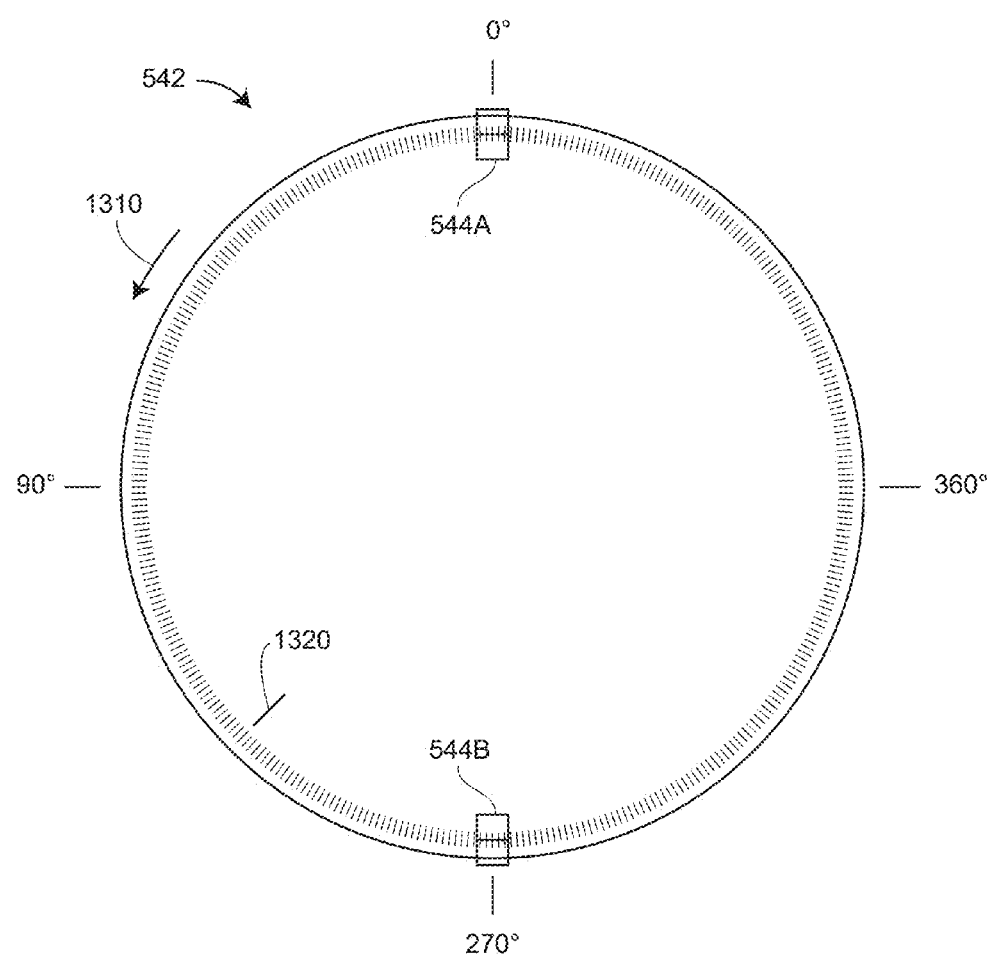
FIG. 13 is a schematic illustration of an encoder having a position of an index mark determined relative to an eccentricity of the encoder.

A reference position in FIG. 18A or 18B corresponds to a position of the angular encoder 542 of FIGS. 5 and 13. The angular position of the encoder 542 corresponding to the reference positions 1820, 1870 may be based on a reading of one or both read heads 544A, 544B. If the encoder disk is rotated by 360 degrees, then an angular reading will be obtained for the reference position and the index mark 1320. For example, if the reference position 1820, 1870 corresponds to the encoder disk as shown in FIG. 13, then an angular difference between the positions of the read head 544A and the index mark 1320 can be found by counting the number of incremental lines between the two based in part. The time at which the index mark is received by the read head may be compared to the received signals such as 1820, 1830 to establish an absolute position for the index mark.

Figure 19:
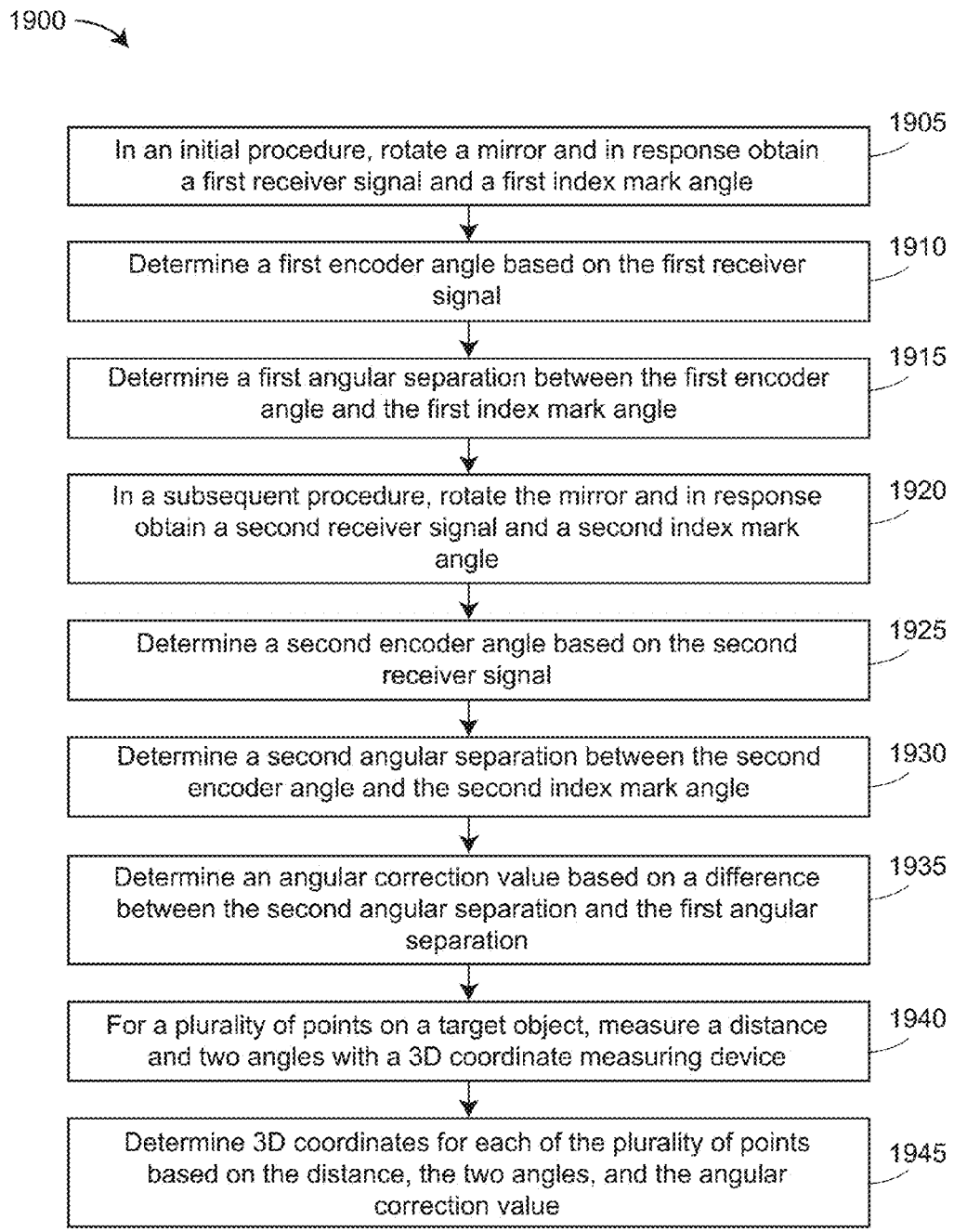
FIG. 19 is a flowchart describing a method for determining an angular correction value based on light reflected by a reflecting prism of the scanner.

The general procedure is described in the flow chart of FIG. 19. In a step 1905, an initial procedure is carried out in which a mirror is rotated to obtain a first receiver signal and a first index mark angle. The first index mark angle is measured sometime during a 360 degree rotation of mirror. In a step 1910, a first encoder angle corresponding to the first receiver signal is found. This may be done by obtaining angular readings for a collection of points along the receiver signal and later interpolating those angular readings to obtain an angle for the reference position (such as 1820 or 1880). In a step 1915, a first angular separation is found as the difference between the first encoder angle and the first index mark angle. In an embodiment, the first angular separation is found at the factory. A subsequent procedure is carried out to detect movements in absolute position of the index mark and correct the resulting errors. In an embodiment, the procedure is carried out whenever the device is repowered. In a step 1920, in the subsequent procedure, a mirror is rotated and in response a second receiver signal and second index mark angle are obtained. In a step 1925, a second encoder angle is determined based at least in part on the second receiver signal. In a step 1930, a second angular separation is found between the second encoder angle and the second index mark angle. In a step 1935, an angular correction value is found based at least in part on a difference between the second angular separation and the first angular separation. In a step 1940, a 3D measurement device measures for each of plurality of points on an object a distance and two angles. In a step 1945, 3D coordinates are determined for each of the points based at least in part on the distance, the two angles, and the angular correction value.

Methods described hereinabove for determining an absolute position of an index mark include (1) determining a position of the encoder in relation to a measured encoder eccentricity error and (2) determining a position of the encoder index mark in relation to a reflected signal received from the scanner prism. A third method for determining an absolute position of an index mark is now given. In the third method, at least two read heads have the ability to generate analog as well as digital signals. Such analog signals, sometimes referred to as sine/cosine or A/B signals, provide a way to interpolate between encoder lines. In an embodiment, when the index mark passes the first read head, the first read head produces a digital signal and, at the same time, the second read head generates an analog signal. In general, the movement in the absolute position of the index mark is expected to change by a small fraction of the angular separation between two adjacent encoder lines. At the time of factory compensation, the analog reading of the second read head is recorded at the time the index mark passes the first read head. Later, after the scanner has been powered down and then powered up again, the procedure is repeated. For a perfectly stable system, the analog reading of the second read head during factory compensation and the analog reading of the second read head obtained later upon repowering the instrument are exactly the same. In practice, the analog values usually differ slightly in the two cases. This difference in values is used to account for any movement in the absolute position of the index mark.

As a simple example, suppose that an encoder disk has 360 encoder lines, each separated by one degree. (In practice, the angular separation between encoder lines is usually much smaller than one degree.) Suppose that the analog signals can be accurately interpolated to 0.01 degree. On power up, the motor turns until the reference signal from the index mark is detected by the first read head. The encoder disk remains positioned with the reference mark at the first read for a moment. At this position, the first read head may read an angle of 0.00 degrees. The second read head would have a reading of approximately 180 degrees, but because the encoder is an incremental encoder, the number of the encoder lines between the first and second read head is not known. For example, there might be 179 or 181 encoder lines between the index mark and the second read head. However, the bearings and encoder on the scanner are relatively stable. Consequently, the difference between the second encoder reading at the time of factory compensation and the encoder reading after repowering the scanner is expected to differ by only a fraction of the separation between encoder lines. For example, if the first read head has a reading of 0.00 degrees, the second read head may have a reading of 180.23 degrees. In this case, we expect the reading of 0.23 degree to be nearly the same in each power up and to match the value obtained following the initial compensation.

It is important to recognize that the second read head may be reading a value a little less or a little more than value at the encoder line. For example, if the analog reading at the second read head were 179.98, we would expect that this change would reflect a movement from the initial value of 180.23 of abs (180.23−179.98)=0.25 degree. A reasonable rule is to select a value for the analog reading at the second encoder such that the abs (current reading−initial reading) ≤0.5 h, where the initial reading is the second encoder reading obtained at the time of the initial factory compensation and h is the angular separation h between adjacent encoder lines. After the readings are obtained for the second read head, they are averaged with the readings of the first read head, taken in this case to be 0.00. So, for the example in which the second read head had a value of 180.23 degree while the first read head had a reading of 0.00 degree would yield a correction value of (0.00+0.23)/2=0.115 degree. The averaging operation is performed because it can be shown that averaging the equivalent of index readings at the two read head provides a constant absolute index position.

It is also possible to use this method with more than two read heads. As in the previous case, the three readings are averaged together. For example, suppose that the three readings, when the index mark is under the first read head, are initially 0.00, 0.95, 0.22 yielding an absolute index position of (0.00+0.95+0.22)/3=0.39. Suppose the next readings are 0.00, 0.11, 0.97. The value 0.11 is corrected to 1.11 by adding h so that it is within h/2 of the initially measured value of 0.95. The value 0.97 is corrected to −0.03 by subtracting h so that it is closer than h/2 to the initially measured value of 0.22. The three corrected values are averaged to obtain an absolute index (reference) position of (0.00+1.11−0.03)/3=0.36.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the laser scanner, partly on the laser scanner, as a stand-alone software package, partly on the laser scanner and partly a connected computer, partly on the laser scanner and partly on a remote computer or entirely on the remote computer or server. In the latter scenario, the remote computer may be connected to the laser scanner through any type of network, including a local area network (LAN) or a wide area network (WAN), or the connection may be made to an external laser scanner (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The term processor as used herein encompasses all types of processing devices including, but not limited to, microprocessors, microcontrollers, digital signal processor (DSP) devices, and field-programmable gate array (FPGA) devices. These devices may be included in the measuring instrument (e.g., the scanner) or in an external computer.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for obtaining a reference correction value for an angular encoder in a laser scanner, the method comprising:
   providing the laser scanner, the laser scanner having a body, a light source, a first motor, a second motor, a first angle measuring device, a second angle measuring device, a distance meter, and a processor, the body including a reference reflector, the light source configured to launch a transmission light beam, the distance meter configured to receive a portion of the transmission light beam reflected off an object and to determine a distance from the scanner to the object in response, the distance based at least in part on the speed of light in air, the first motor and the second motor configured to direct the transmission light beam to a first direction, the first angle measuring device configured to measure a first angle of rotation about a first axis, the second angle measuring device configured to measure a second angle of rotation about the second axis, the first direction determined by the first angle of rotation and the second angle of rotation, the first angle measuring device being the angular encoder, the angular encoder including a patterned element and a read head assembly, the read head assembly including a first read head and a second read head, the patterned element including a plurality of incremental marks and an index mark;
   in a first instance:
      rotating the transmission light beam about the first axis;
      observing the index mark with the first read head and initializing a first count of the incremental marks in response;
      sending the transmission light beam to the reference reflector, reflecting a portion of the transmission light beam as a reference reflected light into the distance meter, and producing with the distance meter a first synchronization signal in response;
      determining with the processor a first difference angle based at least in part on the first count of incremental marks and on the first synchronization signal;

in a second instance:
  rotating the transmission light beam about the first axis;
  observing the index mark with the first read head and initializing a second count of the incremental marks in response;
  sending the transmission light beam to the reference reflector, reflecting a portion of the transmission light beam as a reference reflected light into the distance meter, and producing with the distance meter a second synchronization signal in response;
  determining with the processor a second difference angle based at least in part on the second count of incremental marks and on the second synchronization signal; and
determining with the processor the reference correction value based at least in part on the first difference angle and the second difference angle.

2. The method of claim 1, wherein, in the step of providing the first angle measuring device, the patterned element is an encoder disk and the incremental marks form a periodic pattern.

3. The method of claim 2, wherein, in the step of providing the first angle measuring device, the first read head and the second read head are separated by 180 degrees.

4. The method of claim 1, wherein in the step of providing the laser scanner, the laser scanner further includes a mirror, the mirror configured for rotation about the first axis.

5. The method of claim 4 wherein the body is configured to rotate about the second axis.

* * * * *